US011622158B2

(12) United States Patent
Gault et al.

(10) Patent No.: US 11,622,158 B2
(45) Date of Patent: Apr. 4, 2023

(54) ADAPTIVE BIT RATE DATA CASTING
(71) Applicant: AIRMONT DataCast SAS, Ermont (FR)
(72) Inventors: Jean Francois Gault, Ermont (FR); Sebastien Leroy, Ermont (FR); Damien Jondeau, Ermont (FR)
(73) Assignee: AIRMONT DataCast SAS, Ermont (FR)
( * ) Notice: Subject to any disclaimer, the term of this patent is extended or adjusted under 35 U.S.C. 154(b) by 161 days.
(21) Appl. No.: 17/294,720
(22) PCT Filed: Nov. 15, 2019
(86) PCT No.: PCT/EP2019/081416
§ 371 (c)(1),
(2) Date: May 18, 2021
(87) PCT Pub. No.: WO2020/104300
PCT Pub. Date: May 28, 2020
(65) Prior Publication Data
US 2022/0014826 A1 Jan. 13, 2022

Related U.S. Application Data
(63) Continuation-in-part of application No. 16/580,107, filed on Sep. 24, 2019, now Pat. No. 11,115,449.

(30) Foreign Application Priority Data
Nov. 19, 2018 (EP) .................................... 18206930

(51) Int. Cl.
*H04N 21/6373* (2011.01)
*H04N 21/6405* (2011.01)
(Continued)
(52) U.S. Cl.
CPC ..... *H04N 21/6373* (2013.01); *H04N 21/2662* (2013.01); *H04N 21/43615* (2013.01); *H04N 21/6405* (2013.01)

(58) Field of Classification Search
CPC ...... H04L 41/142; H04L 41/147; H04L 43/04
See application file for complete search history.

(56) References Cited
U.S. PATENT DOCUMENTS

2004/0221304 A1 11/2004 Sparrell et al.
2011/0035668 A1 2/2011 Thiyagarajan
(Continued)

FOREIGN PATENT DOCUMENTS
EP 2720470 A2 4/2014

OTHER PUBLICATIONS

N Bouten et al, "QoE optimization through in-network quality adaptation for HTTP Adaptive Streaming", 2012 8th International Conference on Network and Service Management (CNSM),Oct. 25, 2012 (Oct. 25, 2012), p. 336-342. 7 pages.
(Continued)

*Primary Examiner* — Bryan Lee
(74) *Attorney, Agent, or Firm* — Leason Ellis LLP (57) ABSTRACT The method comprises:—receiving, at a rendering system (101), from a plurality user devices (102-1,102-2,102-3), a plurality of cast requests over a home network (110) for casting data from a cast device (106) communicatively coupled to a first network (108) and a third network (120), onto a plurality display devices (130-1, 130-2, 130-3) communicatively coupled to the home network (110);—transmitting the cast request over a second network (114) to a casting system (104), wherein the casting system (104) is coupled with the cast device (106) through the third network (120);—receiving, in response to transmitting, from the casting system (104) and over a dedicated network (115), the requested data, wherein the data is provided to the casting system (104) by the cast device (106) and the data is obtained by the cast device (106) over the first network (108) and wherein the data over the dedicated network (115) are transmitting at a dynamically changing transfer rate and
(Continued)

wherein the dynamically changing transfer is based on a real time available bandwidth of the dedicated network (115).

12 Claims, 6 Drawing Sheets

(51) Int. Cl.
*H04N 21/2662* (2011.01)
*H04N 21/436* (2011.01)

(56) References Cited

U.S. PATENT DOCUMENTS

| | | | |
|---|---|---|---|
| 2013/0159495 A1* | 6/2013 | Wang | H04N 19/146 |
| | | | 709/224 |
| 2018/0242039 A1* | 8/2018 | Asnis | H04N 21/4147 |
| 2021/0250395 A1* | 8/2021 | VanBlon | H04L 65/60 |

OTHER PUBLICATIONS

Yuan Zhenhui et al, "A Prioritized Adaptive Scheme for Multimedia Services over IEEE 802.11 WLANs", Dec. 1, 2013 (Dec. 1, 2013), vol. 10, No. 4, p. 340-355. 16 pages.

International Search Report and Written Opinion for corresponding International Application No. PCT/EP2019/081416, dated Dec. 20, 2019. 14 pages.

International Preliminary Report on Patentability for corresponding International Application No. PCT/EP2019/081416, dated May 25, 2021. 11 pages.

\* cited by examiner

ADAPTIVE BIT RATE DATA CASTING

CROSS-REFERENCE TO RELATED PATENT APPLICATIONS

This application is a U.S. National Stage Application under 35 U.S.C. § 371 of International Patent Application No. PCT/EP2019/081416, filed Nov. 15, 2019, which claims the benefit of priority of U.S. patent application Ser. No. 16/580,107 filed on Sep. 24, 2019, and European Patent Application No. 18206930.2 filed Nov. 19, 2018, all of which are incorporated by reference in their entireties. The International Application was published on May 28, 2020, as International Publication No. WO 2020/104300 A1.

BACKGROUND

Casting is a technique of controlling a media content being displayed on a computing device via another computing device. There may be two types of casting:
In first type of casting, the first computing device may send an instruction to the second computing device indicating a media to be displayed. In such cases the second computing device retrieves the media from a source of the media. For example, the user may send an instruction, to a cast device coupled to the television, via his mobile device, to display a particular video. The cast device may thereafter retrieve the media from a source of the video, such YouTube, and thereafter may provide the video to the television to display the video.

EP 2720470 A2 discloses a data casting through a third-party aggregator. The third party aggregator aggregates the data from different devices and transmits it to the user device. The user device does not directly communicate with the casting device rather communicates with the aggregator.

US 2018/192122 A1 discloses transmitting data on various devices, such as a television, a home theater, etc., which are present in the same network. In other words, the US 2018/192122 A1 discloses an invention where a device is disclosed which acts as many to many hub for receiving and transmitting data.

Second type of casting, called screen mirroring, may be where a media being played on a first computing device is sent to a second display device or a computing device for being displayed on that device. In such cases, a source of the media is the first computing device.

SUMMARY

According to the present subject matter, a casting environment is disclosed. The casting environment comprises a casting system and a rendering system. The casting system is coupled with a first network having bandwidth which is sufficiently higher than a threshold bandwidth. Further, the casting system is also coupled with a plurality of cast devices. When a user desires to cast a content on a display device which is not in the first network, the user couples the rendering system to the display device.

The user further sends a cast request to the rendering system, over a home network and the rendering system transfers the cast request to the casting system over a second network. The casting system receives the cast request and transfers the cast request to one of the cast devices. The cast device retrieves a data, corresponding to the content requested in the cast request, over the first network and provides the data to an encoder of the casting system.

A casting router of the casting system thereafter determines a real time bandwidth of a dedicated network and based on the real time bandwidth of the dedicated network, the encoder encodes the data. The casting router further transfers the content to a rendering router of the rendering system. The encoder of the casting system dynamically changes the transfer rate according to change in real time bandwidth of the dedicated network.

Thus, when the bandwidth of the dedicated network decreases, the encoder of the casting system accordingly varies so that data transferred to the display device do not exceed the available bandwidth. The rendering system may further allocate a user bandwidth to the plurality of display devices. The display bandwidth is the bandwidth within which the data may be transferred to the plurality of display devices.

In an example, the rendering system may allocate the display bandwidth based on various factors, such as type of data, rank characteristics of user, available bandwidth, user subscription, variable cost of the IP link, . . . etc. Thereafter, the data is transmitted, by the rendering system, to the plurality of display devices, wherein the data transmission occurs within the allocated display bandwidth. Thus, the content is casted by the plurality of display devices in a dedicated network even when the bandwidth of the dedicated network is low. The casting operation is ensured as the casting system is continuously coupled with the first network having a higher bandwidth. The user may permanently couple the casting system with the first network and may cast the content at some other place (at places where the first network is not available) using the rendering system. The user device can use the cast device using native application and without any modification on the user device or cast device.

A first aspect of the present invention provides a method wherein a plurality of cast requests is received at a rendering system from a plurality of user devices over a home network. The cast requests are requested for casting data from a cast device communicatively coupled to a first network and a third network, onto a plurality of display devices communicatively coupled to the home network. Thereafter, the rendering system transmits the cast requests over a second network to a casting system coupled with the cast device through the third network. In response to transmitting, the rendering system receives from the casting system and over a dedicated network the requested data. The data is provided to the casting system by the cast device and the data is obtained by the cast device over the first network. The data over the dedicated network are transmitting at a dynamically changing transfer rate based on a real time available bandwidth of the dedicated network.

In another embodiment, the dedicated network is one of the second network, an unidirectional IP link, a bidirectional satellite network, an unidirectional satellite network, an IP over TV broadcast satellite network, a fourth network, an IP link with variable cost and/or variable bandwidth.

In another embodiment, the home network and the second network are separate network.

In another embodiment, the home network is available in one of a ship, a moving vehicle, an airplane.

A second aspect of the present invention provides a rendering system wherein a plurality of cast requests is received at the rendering system from a plurality of user devices over a home network. The cast requests are requested for casting data from a cast device communicatively coupled to a first network and a third network, onto a plurality of display devices communicatively coupled to the home network. Thereafter, the rendering system transmits the cast requests over a second network to a casting system coupled with the cast device through the third network. In response to transmitting, the rendering system receives from the casting system and over a dedicated network the requested data. The data is provided to the casting system by the cast device and the data is obtained by the cast device over the first network. The data over the dedicated network are transmitting at a dynamically changing transfer rate based on a real time available bandwidth of the dedicated network.

A third aspect of the present invention provides a method comprising the following steps:
 receiving a cast request over a second network from a rendering system, wherein the cast request is a request for casting data from a cast device onto plurality of display devices, wherein the plurality of display devices is communicatively coupled with a home network, and wherein the cast device is communicatively coupled with a first network and a third network;
 transmitting the cast request to the cast device;
 receiving, in response to the transmitting, from the cast device, the data corresponding to the cast request wherein the data is retrieved by the cast device over a first network;
 determining a real time bandwidth of a dedicated network; and
 transmitting the data, at a dynamically changing transfer rate based on the real time bandwidth of the dedicated network, to the rendering system over the dedicated network.

BRIEF DESCRIPTION OF FIGURES

The following detailed description references the drawings, wherein.

DETAILED DESCRIPTION

In modern world, due to omnipresence of networks around, there have been considerable development in the way a media is distributed and displayed. Content casting is such a service in which a user device may send an instruction to a cast device which may instruct the cast device to retrieve a content from a source and thereafter display the content on a display device.

For example, the user device may send an instruction to the cast device to play a video from a source, say YouTube. The cast device may access the video from the YouTube server via a network and may thereafter provide the video to a display device for display. In an example, the user device may be a mobile phone and the cast device may be a casting device, such as Chromecast.

The limitation of the above casting operation is that the casting operation cannot work when the cast device and the user device is in two different networks. Discovery of cast device by the user device is based on multicast protocol like MDSN which by construction cannot work if the two devices are in separated network (cf RFC 6762 A host sending Multicast DNS queries to a link-local destination address (including the 224.0.0.251 and FF02::FB link-local multicast addresses) MUST only accept responses to that query that originate from the local link, and silently discard any other response packets).

Furthermore, for the above system to work the display device and cast device must remain in close vicinity as they may be coupled by a HDMI cable or others means (IP, VGA, USB . . . ).

Furthermore, the above explained casting operation works in a network which has a bandwidth above a certain threshold and when the bandwidth decreases below the threshold, the casting stops. For example, when a user is using the cast device in the home network that has sufficient bandwidth (above threshold), the casting operation works smoothly. However, when a user tries to use the casting device in a place where the network does not have a bandwidth above the threshold, the casting operation does not work. For example, when the user is travelling in a vehicle (ship, vessel, airplane) and tries to cast a content on a display device available in the vehicle using his casting device and a network available in the vehicle does not have a bandwidth above the threshold, the casting operation cannot be performed. In other words, a transfer rate for the casting operation is fixed and below a threshold transfer rate, the casting operation cannot be performed. Moreover, by default, video services, as streaming, will generally try to give to the user the best video and audio quality. This means that video service will try to allocate the full bandwidth available for the user. As a consequence example, when multi-users are on a plane, using internet via satellite, someone using video service will greatly impact the bandwidth available for the others.

Another limitation is that content retrieval by the casting device is done by TCP connection and cannot use a unidirectional link. It is not possible for a user to select a content when a bidirectional link is available, then use a unidirectional link (IP over TV broadcast satellite) to retrieve the content.

The above techniques are further described with reference to FIG. 1 to FIG. 6. It should be noted that the description and the figures merely illustrate the principles of the present subject matter along with examples described herein and should not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof. It should be understood that all networks mentioned in the current invention are compatible with any internet protocol IP as IPv4 or IPv6.

Figure 1:
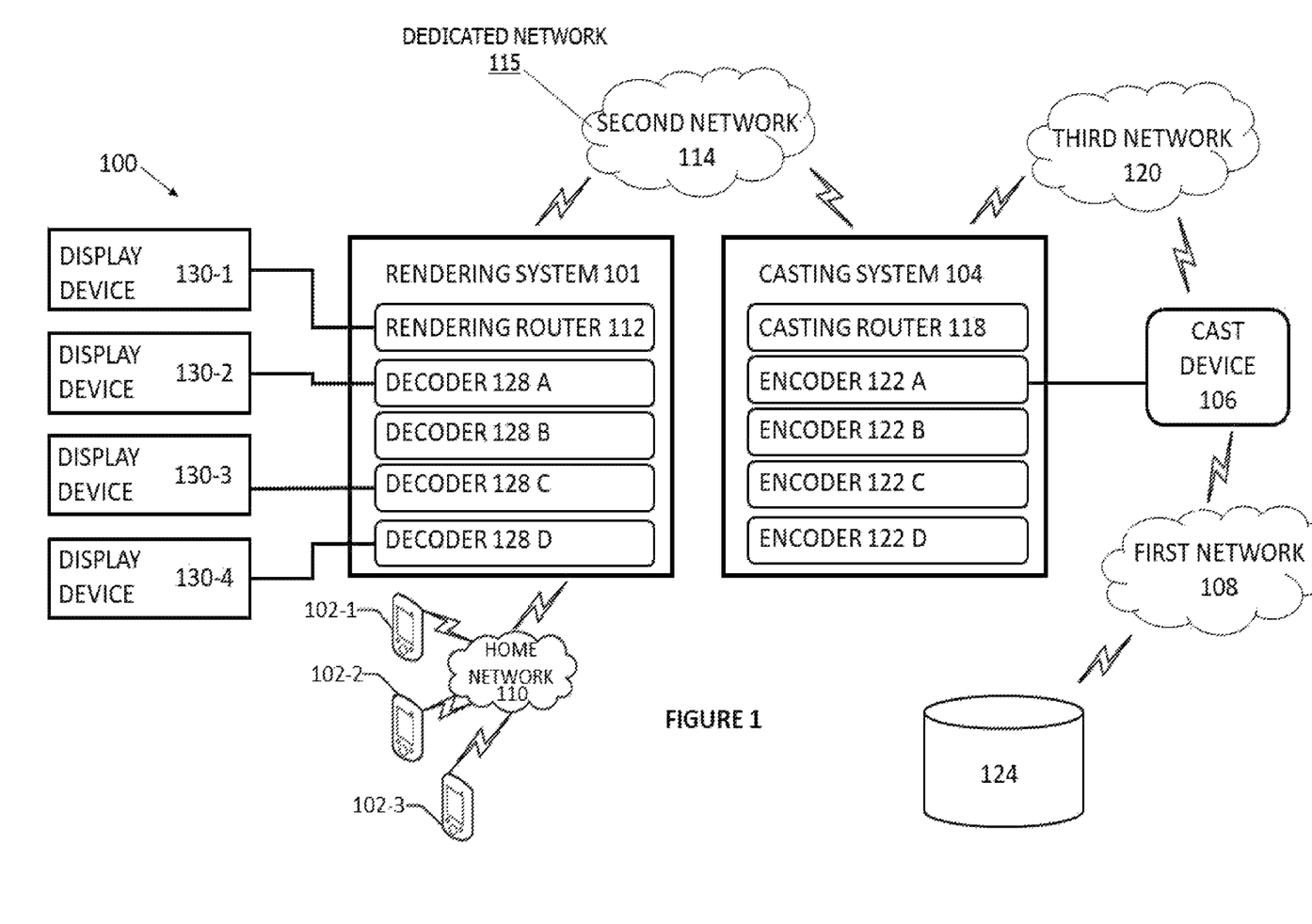
FIG. 1 illustrates a casting environment in accordance with an example implementation of the present subject matter wherein the dedicated network is a bidirectional link.

FIG. 1 shows a casting environment 100 for casting of data on a plurality of user devices 102-1, 102-2, 102-3. The network environment comprises a rendering system 101, a casting system 104, a plurality of cast device 106, a plurality of display devices 130-1, 130-2, 130-3, 130-4. In an example, the user devices 102-1, 102-2, 102-3 may be a mobile device, a laptop, a desktop or any other device which may have casting capabilities. Display devices 130-1, 130-2, 130-3, 130-4 has been shown separately in FIG. 1, however, in an example, display devices 103-1, 103-2, 103-3 may be integrated with the rendering system 102 or on the user devices 102-1, 102-2, 102-3. The display device 130 is one of a television, a monitor, a tablet, a screen, or analog on which the video stream resulting from the cast request from the plurality of user devices will be played.

The rendering system 101 is composed of a rendering router 112 and a plurality of decoders 128-A, 128-B, 128-C, 128-D. For the sake of simplicity, the decoder 128 is represented in FIG. 1 as a separate entity, but it must be understood that the decoder 128 can be physically integrated in the rendering router 112, in the user device 102 or in the display device 130. Moreover, the decoder 128 and the rendering router 116 can be located in separated network in the vessel. The decoder 128 transmits the video to the display device 130 by HDMI, VGA, USB, IP or any other means.

The cast device (s) 106 is (are) coupled to a first network 108. The first network 108 has an average bandwidth which is sufficiently above than a threshold bandwidth required for the casting operation to function. In an example, the first network 108 may include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NON), satellite network, and Public Switched Telephone Network (PSTN). Depending on the technology, the first network 108 includes various network entities, such as gateways, routers; however, such details have been omitted for the sake of brevity of the present description.

In an example, the plurality of user devices 102-1, 102-2,102-3 is in a home network 110 which has a bandwidth lower than the threshold bandwidth. A user wishes to cast data on a display device 130-1. In accordance with the example implementation of the present subject matter, the user couples the rendering system 101 with the display device 130-1. The rendering system 101 may be coupled to the display device 130-1 via connectors, such as HDMI, VGA, USB.

The user device 102-1 is coupled with the home network 110. The user device 102-1 may automatically retrieve information about casting systems presenting the network environment (explained later with reference to FIG. 5). The user device 102-1 may be thereafter used to select the casting system which he intends to use for casting data. In an example implementation of the present subject matter, the user, using the user device 102-1 sends a cast request to the rendering system 101 over the home network 110. In an example, the cast request may be understood as a request for casting a content on the user device 102-1. The cast request may comprise details, such as uniform resource locator of the content and identification (ID) of the casting system to which the cast request is directed to. The home network 110 is a network in which the user is currently present. The home network 110 may have similar configuration as of the first network 108.

After receiving the cast request from the user device 102-1, a rendering router 112 of the rendering system 101 transmits the cast request to the casting system 104 over a second network 114. The second network 114 may be a satellite network, internet network, intranet network, general packet radio service (GPRS) network etc. Further, it is clear from the above description that the home network 110 and the second network 114 are two distinct and separate network.

The casting system 104 comprises a casting router 118 and an encoder 122. The casting system 104 is further coupled to the cast device 106. The cast device 106 is coupled with the encoder 122 via a connection, such as HDMI, VGA etc. and the casting router 118 is coupled to the cast device 106 via a third network 120. The cast device 106 is further coupled with the first network 108. The cast request sent by the rendering system 101, over the second network 114, is received by the casting router 118. The casting router 118 further transmits the cast request to the cast device 106, over the third network 120. In an example, there may be more than one cast device and the casting router 118, based on an identification formation received with the cast request, may determine a cast device to which the cast request should be directed to. In an example, the third network 120, may have similar configuration as of the first network 108.

Upon, receiving the cast request, the cast device 106 analyzes the cast request and determines data to be retrieved. The cast device 106 determines the data to be retrieved based on the cast request. In an example, the cast request may comprise a uniform resource locator (URL) of the data to be retrieved and the cast device 106 may retrieve the data by accessing the URL. The cast device 106 may access a source 124, over the first network 108, to retrieve the data. In an example, the source 124 may be a database. The first network 108 may have a sufficiently large bandwidth so as to access the requested data from the database.

After the data is retrieved from the source 124, the cast device 106 thereafter forwards the retrieved data to the encoder 122 via HDMI/VGA cable. The casting router 118 determines a real time bandwidth of a dedicated network 115.

In reference with FIG. 1, the dedicated network 115 is a bidirectional link, such as a reserved capacity on the second network 114, an alternate bidirectional satellite network, an alternate GSM network, an alternate internet network.

Figure 2:
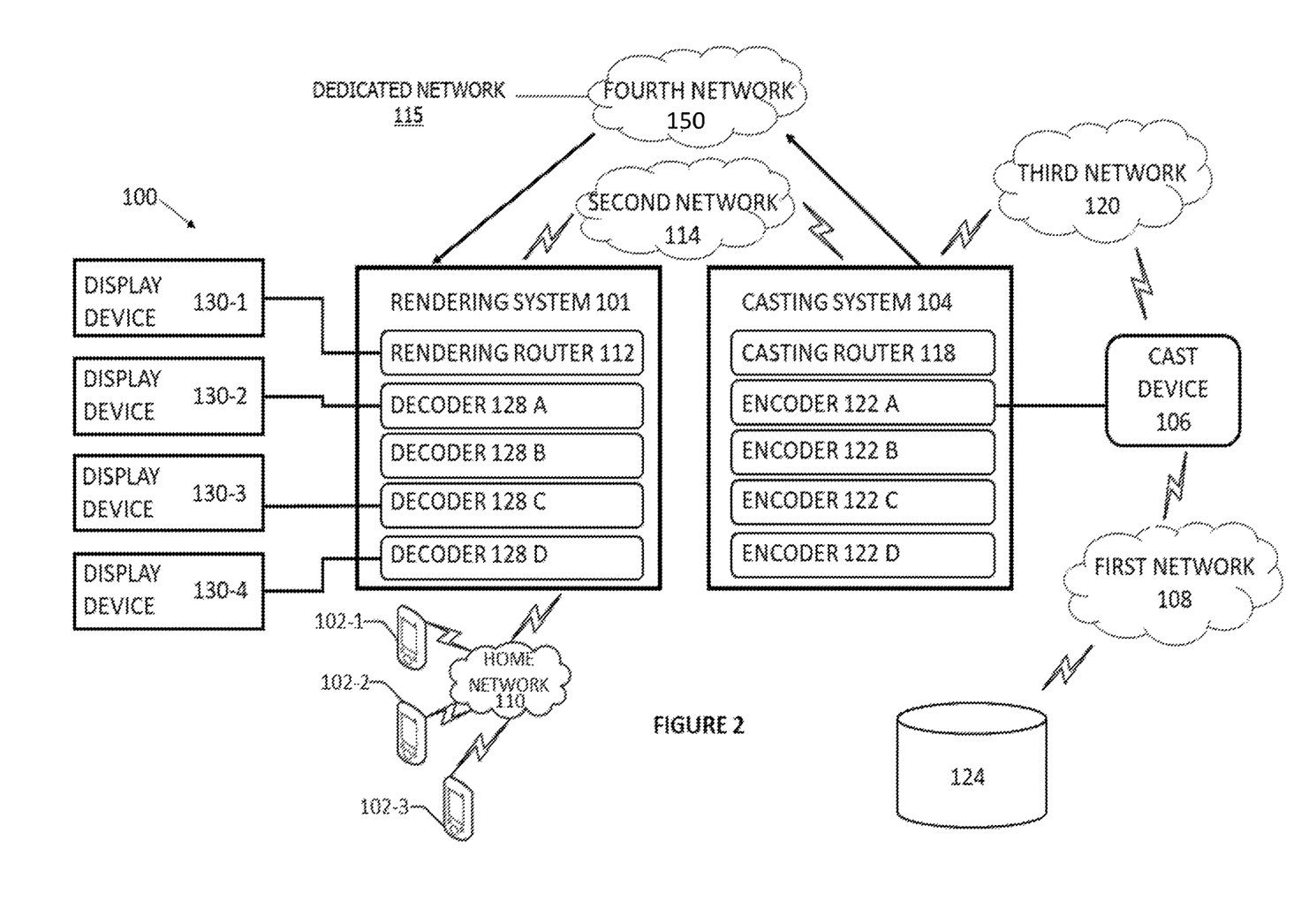
FIG. 2 illustrates a casting environment in accordance with another example implementation of the present subject matter wherein the dedicated network is an unidirectional link.

In reference with FIG. 2, identical to FIG. 1 except dedicated network 115, the dedicated network 115 is an unidirectional link 150, such as an unidirectional satellite link, an IP over TV broadcast satellite network.

The casting router 118 determines a bandwidth of a dedicated network 115 and thereafter determines a transfer rate at which the data has to be sent. To determine the bandwidth, the casting router may determine the nature of the dedicated network. It may determine the bandwidth based on a preconfigured fix dedicated bandwidth, a percentage of the real time bandwidth, a calculation based on the cost of the link to achieve a constant price per hour. After the transfer rate is determined, the encoder 122 encodes the data, based on the determined transfer rate, to generate an encoded data. The encoded data is encoded by the encoder 122 such that the data can be transferred within determined transfer rate. The encoder 122 thereafter transmits the encoded data to casting router 118. The casting router 118 transmits the encoded data to the rendering system 101 over the dedicated network 115. Thus, as the real time bandwidth of the dedicated network 115 changes, the transfer rate of the data also changes dynamically. The transfer rate is increased when the real time bandwidth of the dedicated network 115 increases and the transfer rate is decreased when the real time bandwidth of the dedicated network 115 decreases.

The rendering router 112 of the rendering system 101 receives the encoded data from the casting system 104 over the dedicated network 115. The rendering router 112 may thereafter provide the data to a decoder 124. The decoder 128 may decode the data and thereafter the data may be provided to the display device 130. In an example, the casting router may allocate a fraction of the dedicated bandwidth to each of the display device 130-1, 130-2, 130-3. In an example, the casting router will determine the fraction of the dedicated bandwidth allocated to a display device based on various parameters, such as rank characteristic of the user device, number of user device currently casting and there rank characteristic, total bandwidth usage over a period of time. The encoder thereafter encoded the data such that the data can be transferred within determined transfer rate for each display device.

The rendering system 101 thereafter transmits the data to the display devices 130-1, 130-2, 130-3 within the corresponding allocated display bandwidth for each of the display devices 130-1, 130-2, 130-3. After receiving the data, the display device 102-1 may display the data. In example, the data may be an audio stream, video stream, etc.

Consider an example, where a user travelling in a ship wishes to cast the data on a user device available on the ship. The network available on the ship may be referred to as home network. The bandwidth of the internet link to the home network is such that a cast device cannot be used in the home network to cast data.

The user wishes to cast the data from a cast device available in the user's home and which is coupled to a first network available in the user's home. The cast device at the user's home is also coupled with a casting system, such as the casting system 104. The user couples a rendering system 101 to the user device and sends, via his mobile device, a cast request to the rendering system. The rendering system transmits the cast request to the casting system over a satellite network which may be accessible on the ship. The casting system sends the cast request to the cast device. The cast device retrieves the data from a source and provides the data to the rendering system. The casting router determines a real time bandwidth of the satellite network and thereafter determines a transfer rate at which the data should be transferred on the dedicated network. The casting router also analyzes the number of users currently using the dedicated network and allocates a fraction of the bandwidth to the user. The transfer rate is dynamically changed in accordance with a change in the real time bandwidth of the dedicated network 115 and in accordance of the number of casting system currently in use. The encoder encodes the data such that the data can be transferred within determined transfer rate. The casting system thereafter transmits the data to the rendering system via the satellite network. Finally, the rendering system may forward the data to the display device. Thus, the casting of the data is not restricted by the low bandwidth of the internet link to the home network available in the ship.

Figure 3:
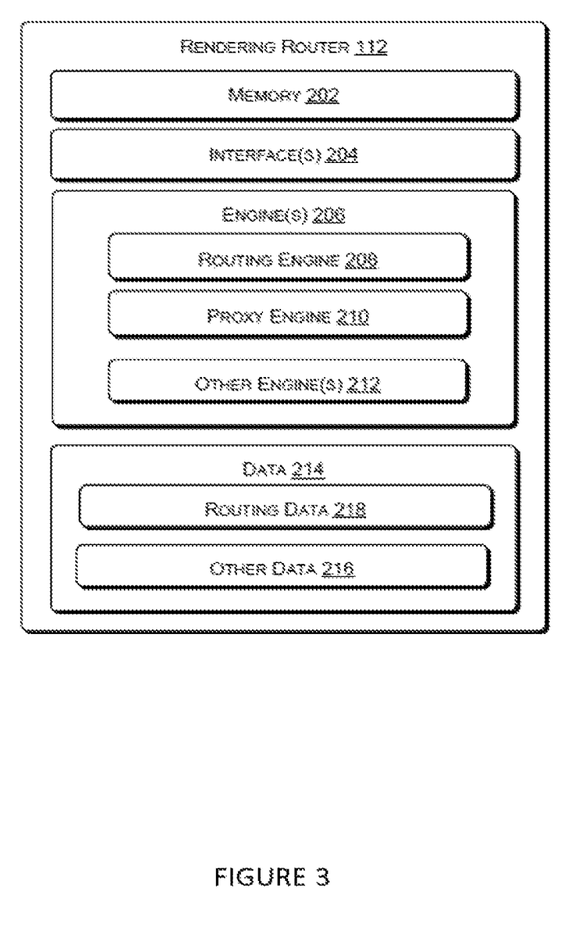
FIG. 3 illustrates a rendering router in accordance with an example implementation of the present subject matter.

FIG. 3 illustrates the rendering router 112, in accordance with an example of the present subject matter.

The rendering router 112, among other things, includes a memory 202, interface(s) 204, engine(s) 206, and data 214. The memory 202 may include any computer-readable medium including, for example, volatile memory (e.g., RAM), and/or non-volatile memory (e.g., EPROM, flash memory, etc.). The interface(s) 204 may include a variety of software and hardware interfaces that allow the rendering router 112 to interact with other devices or other input/output (I/O) devices.

The engine(s) 206 may be implemented as a combination of hardware and programming (for example, programmable instructions) to implement certain functionalities of the engine(s) 206, routing of the cast request and propagation of automatic discovery of cast devices. In examples described herein, such combinations of hardware and programming may be implemented in several different ways. For example, the programming for the engine(s) 206 may be processor executable instructions stored on a non-transitory machine-readable storage medium and the hardware for the engine(s) 206 may include a processing resource (for example, implemented as either a single processor or a combination of multiple processors), to execute such instructions. In the present examples, the machine-readable storage medium may store instructions that, when executed by the processing resource, implement engine(s) 206.

In such examples, the rendering router 112 may include the machine-readable storage medium storing the instructions and the processing resource to execute the instructions, or the machine-readable storage medium may be separate but accessible to the rendering router 112 and the processing resource. In other examples, engine(s) 206 may be implemented by electronic circuitry. The engine(s) 206 may include a routing engine 208 and a proxy engine 210. In an example, the engine(s) 206 may also comprise other engine(s) 212 that supplement functions of the rendering router 112.

Data 214 serves, amongst other things, as a repository for storing data that may be fetched, processed, received, or generated by the engine(s) 206. The data 214 comprises other data 216 corresponding to the other engine(s) 212. In the illustrated example, the data 214 also comprises routing data 218. In an example, the casting router 118 has a similar physical configuration as of the rendering router 112.

In operation, an automatic discovery of the available cast system is performed by the user device. The routing engine will forward the discovery to the plurality of cast device and will transmit the answer to the user device. The user chose a cast system and the cast request is received by the routing engine 208. The routing engine 208 may thereafter retrieve a required address from the routing data 218 and may transmit the cast request to a casting system, such as the casting system 104. The routing engine 208 also receives the encoded data from the casting system 104. In an example, the routing engine 208 may use a proxy engine 210 to send the cast request and receive the encoded data. The proxy engine 210 acts as an intermediary between the routing engine 208 and the casting system 104. Using the proxy engine 210 improves the response time of sending the cast request. The proxy engine 210 may store a cache of previously connected casting systems and may help in faster connection of the casting system 104 and the routing engine 208. The proxy engine 210 may also help in increasing the security of the data transmitted and received.

Figure 4:
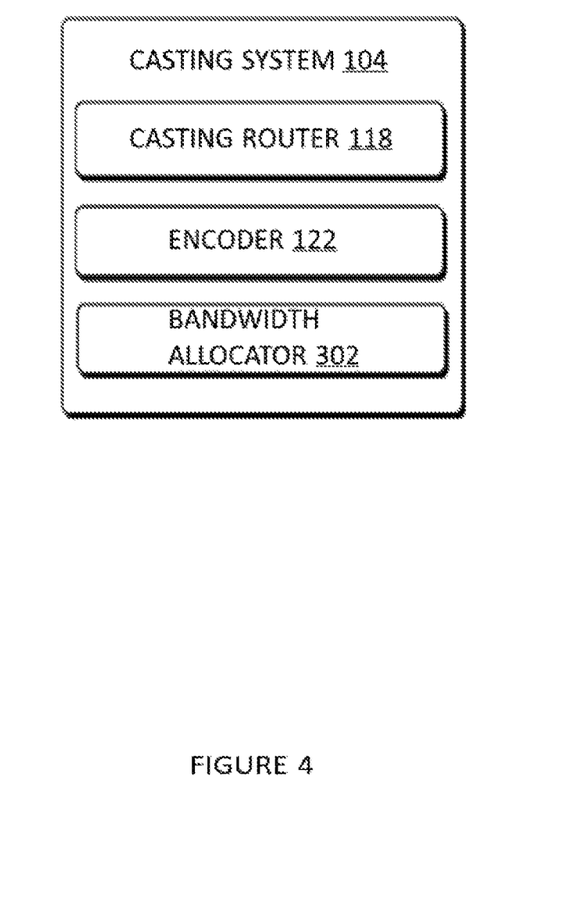
FIG. 4 illustrates a rendering system in accordance with an example implementation of the present subject matter.

FIG. 4 illustrates another embodiment of casting system 104 is accordance with an example implementation of the present subject matter. The casting system 104 comprises a bandwidth allocator 302 in addition to the previously explained casting router 118 and decoder 122. The bandwidth allocator 302 allocates a display bandwidth to the display devices, such as the display devices, 130-1, 130-2, 130-3. The display devices thereafter receive the data from the casting system 104 within the allocated display bandwidth.

In an example, it is possible that a user device may take up a large portion of the available bandwidth and the other devices may not be able to communicate due to unavailability of bandwidth. For example, if a user device which connects early and starts casting a high definition video from the casting system, the user may take up a very high bandwidth of the network in which the user device is present. The other user may further face difficulty in casting data from the casting system. Thus, in an example implementation of the present subject matter, the bandwidth allocator 302 of the rendering system 101 manages a DISPLAY bandwidth, i.e., the bandwidth allocated to the display devices, to ensure user experience is as expected.

In an example, the network may be a home network 108 and the bandwidth allocator 302 may allocate the display bandwidth (out of the total bandwidth of the home network) to each of the user/display devices. In an example, the bandwidth allocator 302 allocates a display bandwidth to a display device such that the user may be able to cast a video, but not in high definition, such that the bandwidth can be saved and may be allocated to other display devices. The bandwidth allocator 302 may also consider the number of user/display devices in efficiently allocating the display bandwidth to the user/display devices.

Further, in an example, each of the user/display devices may have a rank characteristic and the bandwidth allocator 302 may allocate the display bandwidth to the display devices based on the rank characteristic of the user/display device. In an example, the rank characteristic of the display device may indicate an amount of bandwidth to be allocated to the display device. In an example, the user devices may be subscribed to various plans which may offer different bandwidths to the user/display devices. For example, there may be a plan A which when subscribed by a user device may indicate that the subscribed user device has the priority to take up more display bandwidth as compared to the user devices which are not subscribed to the plan. Thus, in an example, a subscription to the plan may indicate a rank characteristic of the user/display device. The bandwidth allocator 302 may analyze the rank characteristic of the user/display devices and may accordingly allocate display bandwidths to the user/display devices. Considering previous example, when the user device is subscribed to plan A, the bandwidth allocator may allocate more display bandwidth to the user device when compared to display bandwidths allocated to other user/display devices.

After, the display bandwidths are allocated to the user devices, the bandwidth allocator 302 may indicate encoder 122 to encode the data at a given bandwidth. The bandwidth allocator 302 does not allow the display devices to breach the display bandwidth allocated to them. In an example, to prevent the breach of display bandwidth allocated to the display devices, the bandwidth allocator may indicate the encoder to stop the transmission of the data to the display devices or may indicate the encoder to lower the quality (bitrate) of the data being transmitted to the display devices.

Figure 5:
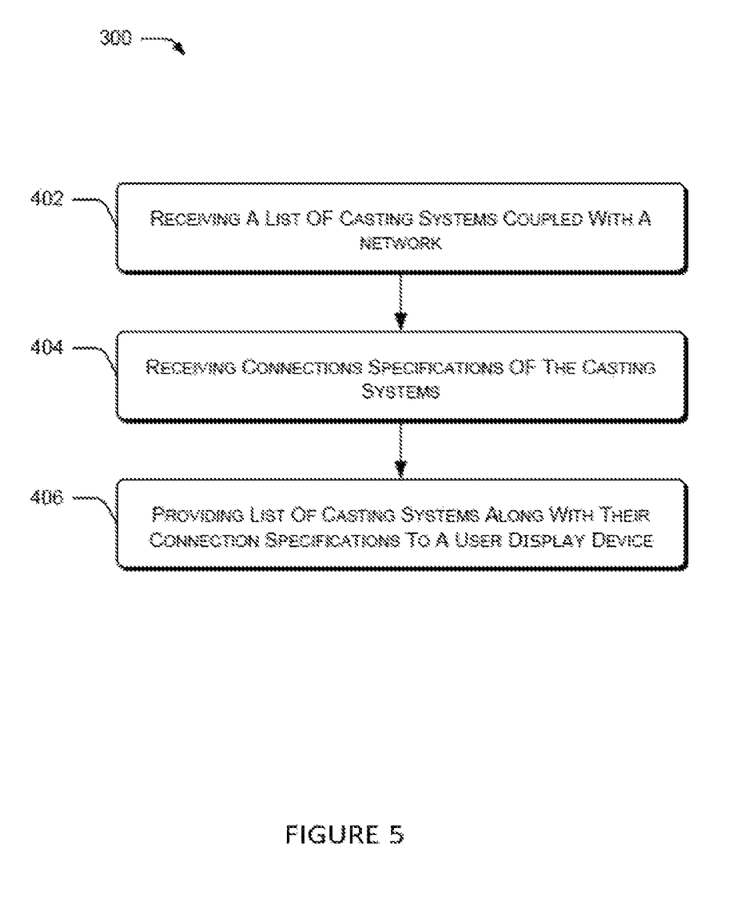
FIG. 5 shows a method for determining a list of casting systems present in a network according to an example of the present subject matter.

FIG. 5 illustrates a method 400 for determining a list of casting systems in a network, in accordance with an example of the present subject matter. Although the method 400 may be implemented in a variety of routers, but for the ease of explanation, the present description of the example method 400 to provide suggestions is provided in reference to the above-described rendering router 112.

The order in which the method 400 is described is not intended to be construed as a limitation, and any number of the described method blocks may be combined in any order to implement the method 400, or an alternative method.

At block 402, the rendering router 402 receives a list of all casting systems coupled with a network, such as the second network 114. In an example, the rendering router 402 receive the list of casting systems form the casting router 118 which has automatically discovered the list of casting systems present in the second network 114 or the third network 120.

At block 404 the rendering router 112 receives connection specifications of each of the casting systems. The connection specification may indicate the protocols used by the casting systems for connecting to a network. In an example, the rendering router 112 may receive the connection specifications form the casting router 118.

At block 406, the rendering router 112 provides the list of casting systems along with their connection specifications to a user device, such as the user device 102-1 which may then use the casting system for casting data.

Figure 6:
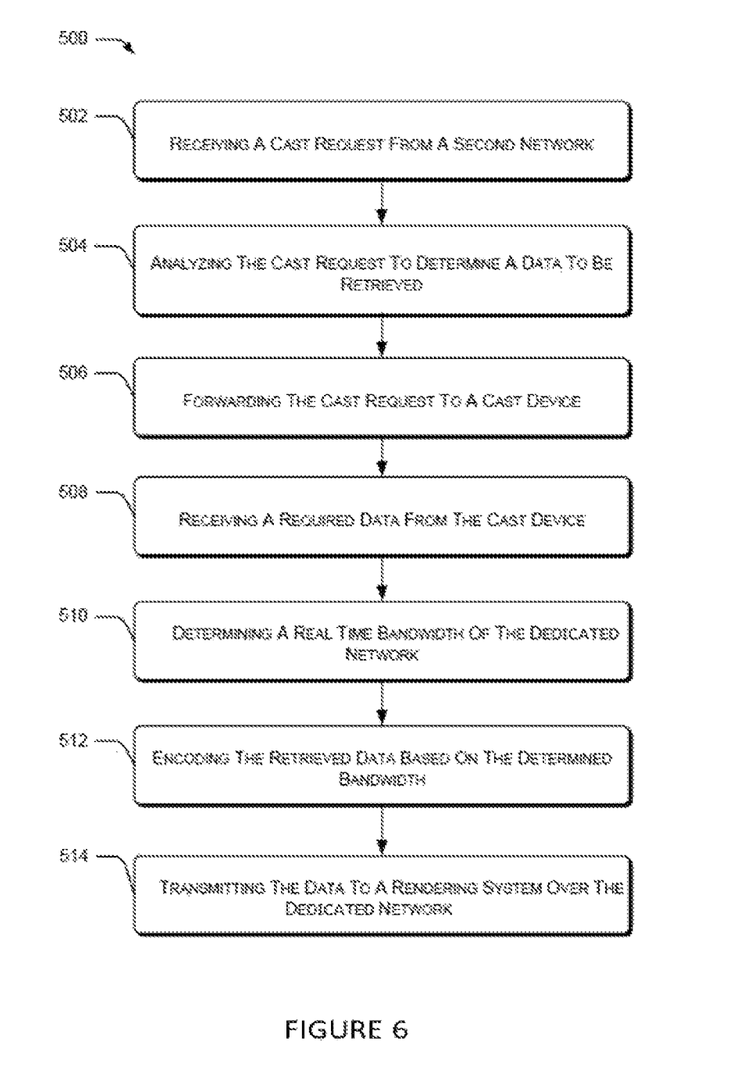
FIG. 6 shows a method of casting data according to an example implementation of the present subject matter.

FIG. 6 illustrates a method 500 for casting data, in accordance with an example of the present subject matter. Although the method 500 may be implemented in a variety of casting system, but for the ease of explanation, the present description of the example method 500 to provide suggestions is provided in reference to the above-described casting system 104.

The order in which the method 500 is described is not intended to be construed as a limitation, and any number of the described method blocks may be combined in any order to implement the method 500, or an alternative method.

At block 502, a cast request is received by the casting system 104 over a second network, such as the second network 114. In an example, the cast request is received by a casting router, such as the casting router 118, of the casting system 104. In an example, the cast request may be initiated in a home network, such as the home network 110. The cast request may be initiated by a user device, such as the user device 102-1.

At block 504, the casting system 104 analyzes the cast request to determine a data to be retrieved. The cast request comprises details about the data to be retrieved. In an example, the cast request may comprise a URL of the data to be retrieved.

At block 506, the casting system 104 forwards the cast request to a cast device. In response to forwarding the cast request, the casting system 104 receives a required data from the cast device at block 508.

At block 510, the casting system 104 determines a bandwidth of the dedicated network 115 and at block 512, the casting system 104 encodes the retrieved data based on the determined bandwidth. In an example, the retrieved data may be encoded at a higher bit rate if the bandwidth is determined to be higher while the retrieved data is encoded at a lower bit rate if the bandwidth is determined to be lower.

At block 514, the casting system 104 sends the encoded data to the rendering system 102.

Thus, the methods and devices of the present subject matter provide techniques for casting of data. Although examples of casting data have been described in a language, specific to structural features and/or methods, it is to be understood that the description are not necessarily limited to the specific features or methods described. Rather, the specific features and methods are disclosed as example for casting data.

We claim:

1. A method comprising:
   receiving, at a rendering system from a plurality user devices, a plurality of cast requests over a home network for casting data from a cast device communicatively coupled to a first network and a third network, onto a plurality display devices communicatively coupled to the home network;

transmitting one of the plurality of cast requests over a second network to a casting system, wherein the casting system is coupled with the cast device through the third network;

receiving, in response to transmitting, from the casting system and over a dedicated network, the requested data, wherein the data is provided to the casting system by the cast device and the data is obtained by the cast device over the first network and wherein the data over the dedicated network are transmitting at a dynamically changing transfer rate and wherein the dynamically changing transfer rate is based on a real time available bandwidth of the dedicated network, wherein casting the data from the cast device to the plurality of display devices further comprises:

determining a rank characteristic of each of the plurality of display devices, wherein the rank characteristic of each of the plurality of display devices indicates an amount of bandwidth to be allocated each of the plurality of display devices;

allocating a display bandwidth to each of the plurality of display devices based on the rank characteristic of each of the display devices; and transferring, over the home network, the data to the plurality of the display devices within the allocated display bandwidth.

2. The method as claimed in claim 1, wherein the dynamically changing the transfer rate comprises:

increasing the transfer rate when the real time available bandwidth of the dedicated network increases; and decreasing the transfer rate when the real time available bandwidth of the dedicated network decreases.

3. The method as claimed in claim 1, wherein the display bandwidth is dynamically modified based on a change in the rank characteristics of the display devices.

4. The method as claimed in claim 1, wherein casting the data from the cast device to the plurality of display devices further comprises:

allocating a display bandwidth to each of the plurality of display devices based on the user characteristics, the pre-defined maximum and committed services in the subscription plan; and transferring, over the home network, the data to the plurality of the display devices within the allocated display bandwidth and adjusting traffic characteristics accordingly and dynamically.

5. The method as claimed in claim 1, wherein the dedicated network is one of the second network, an unidirectional IP link, a bidirectional satellite network, an unidirectional satellite network, an IP over TV broadcast satellite network, a fourth network, an IP link with variable cost and/or variable bandwidth.

6. The method as claimed in claim 1, wherein the home network and the dedicated network (115) are separate network.

7. The method as claimed in claim 1, wherein the home network is available in one of a ship, a moving vehicle, an airplane.

8. The method as claimed in claim 1 further comprises receiving a list of casting devices along with their connection specifications and forwarding the connection specifications to the plurality of user device.

9. A rendering system comprising:

a rendering router to:

receive, over a home network, a plurality of cast requests from plurality of user devices, wherein the plurality of cast requests are for casting data from a cast device onto the plurality of display devices, wherein the plurality of display devices are communicatively coupled to the home network, and wherein the cast device is communicatively coupled with a first network and a third network;

transmit one of the plurality of cast requests to a casting system over a second network, wherein the casting system is coupled with the cast device over the third network;

receive, from the casting system, in response to the transmission and over a dedicated network, the data, at a dynamically changing transfer rate, wherein the dynamically changing transfer rate is based on a real time bandwidth of the dedicated network; and wherein the data is provided to the casting system by the cast device, and wherein the data is obtained by the cast device over the first network, wherein the rendering system further comprises a bandwidth allocator to:

determine a rank characteristic of the plurality of display devices, wherein the rank characteristic of the plurality of display devices indicates an amount of bandwidth to be allocated the plurality of display devices;

allocate a user bandwidth to each of the plurality of display devices based on the rank characteristic of the plurality of display devices; and transfer, over the home network, the data to the plurality of the display devices within the allocated display bandwidth.

10. The rendering system as claimed in claim 9 wherein the rendering router is to:

increase the transfer rate when there is an increase in real time bandwidth of the dedicated network; and decrease the transfer rate when there is a decrease in the real time bandwidth of the dedicated network.

11. The rendering system as claimed in claim 10, further comprising a plurality of decoders to decode the received data and forward the decoded data to the plurality of display devices.

12. The rendering system as claimed in claim 9, wherein the bandwidth allocator is further configured to:

detect a type of data to be transmitted to the plurality of display devices over the home network, wherein the type of data is one of an audio data, video data, image data, a combination of audio and video data;

allocate a display bandwidth to each of the display devices based on the type of the data, user characteristics, pre-defined maximum and committed services in the user subscription plan; and transfer, over the home network, the data to the plurality of the display devices within the allocated display bandwidth and adjust traffic characteristics accordingly and dynamically.

* * * * *